United States Patent
Webster

(10) Patent No.: US 10,353,949 B2
(45) Date of Patent: Jul. 16, 2019

(54) OPTICALLY INITIATED CONFIGURATION AND CRYPTOGRAPHIC TEST KEY TRANSFER FOR TESTING INTERCONNECTED ELECTRONIC DEVICES

(71) Applicant: David Webster, Murrieta, CA (US)

(72) Inventor: David Webster, Murrieta, CA (US)

( * ) Notice: Subject to any disclaimer, the term of this patent is extended or adjusted under 35 U.S.C. 154(b) by 0 days.

(21) Appl. No.: 15/255,940

(22) Filed: Sep. 2, 2016

(65) Prior Publication Data

US 2017/0061238 A1 Mar. 2, 2017

Related U.S. Application Data

(60) Provisional application No. 62/213,557, filed on Sep. 2, 2015.

(51) Int. Cl.
  *G06K 9/00* (2006.01)
  *G06F 16/532* (2019.01)
  *G06F 16/583* (2019.01)

(52) U.S. Cl.
  CPC ........ *G06F 16/5838* (2019.01); *G06F 16/532* (2019.01); *G06K 9/00624* (2013.01); *G06K 2209/03* (2013.01)

(58) Field of Classification Search
  None
  See application file for complete search history.

(56) References Cited

U.S. PATENT DOCUMENTS

| | | | |
|---|---|---|---|
| 2011/0016405 A1* | 1/2011 | Grob | H04N 1/00127 715/740 |
| 2011/0149720 A1* | 6/2011 | Phuah | H04L 12/2697 370/216 |
| 2015/0271257 A1* | 9/2015 | Abramov | H04L 67/104 709/222 |

* cited by examiner

*Primary Examiner* — Sumati Lefkowitz
*Assistant Examiner* — David Perlman
(74) *Attorney, Agent, or Firm* — Donn K. Harms

(57) ABSTRACT

A method identifying electronic communication components employed for transmitting and receiving electronic communications for subsequent testing thereof is provided which identifies each electronic communication component using a digital photo thereof. Communications characteristics required for communicating with each identified component are discerned using the component identity ascertained from the digital image.

15 Claims, 3 Drawing Sheets

OPTICALLY INITIATED CONFIGURATION AND CRYPTOGRAPHIC TEST KEY TRANSFER FOR TESTING INTERCONNECTED ELECTRONIC DEVICES

This application claims priority to U.S. Provisional Patent Application Ser. No. 62/213,557 filed on Sep. 2, 2015, which is included herein in its entirety by this reference thereto.

1. FIELD OF THE INVENTION

The present invention relates generally to logic analyzing and analytic components which are interfaced between multiple electronic components which send and receive electronic data using electronic signals. More particularly, the invention relates to a method and apparatus for automatically determining the proper communications protocol and interconnection requirements for communication between connected electronic devices, through the employment of optical recognition of each such component to be employed, to thereby ascertain communications protocols and security keys and data interconnections for testing communications.

2. PRIOR ART

Electronic communication between computers and other electronically connected communications components and systems and related technologies are well known. With the advent of computer and other electronic data communication between transmitting and receiving devices, electronic signals carrying data to be used for communicating and for initiating action by remote receiving devices and components are sent over electronic communications channels established between each sending component and each receiving component. Such communications are generally accomplished using a particular electronic protocol which is applied to the electronic signal, to communicate electronic data between the two or more electronic devices. In many cases for communications between electronic devices having output and input ports, specific cabling is configured to engage communication ports in each of the transmitting and receiving devices.

Modernly, such electronic signals, employing specific signal protocols, carry data on a communications channel which can be local or over distances of miles or thousands of miles. Further, such communications have gotten more sophisticated over time through the employment of differing electronic signal protocols. For instance, the well known RS-232 protocol is still widely employed today in electronics equipment, as are ethernet protocols and other network communications protocols.

Further complicating successful communications, electronic data communications are often rendered secure through the employment of encoded or encrypted transmission signals. Such encoded signals require one or more electronic keys to enable decryption of the encrypted transmitted electronic data to thereby render it useable by the receiving device.

Unfortunately, inaccurate or unusable electronic communications can result from numerous defective communication sources along a transmission pathway. Such defective communications generally result in electronic noise being communicated into a transmitted electronic signal or gaps forming in the signal when received. Such errant signals can occur due to wire breaks, or where connections have corroded, or become loose, or electronic parts are failing and for a plethora of other reasons. Correcting this problem of an errant signal being received is a communication nightmare where the electronic signal is both in an electronic protocol more affected by noise, and/or which is encrypted in a manner where signal noise renders the electronically encrypted signal unuseable.

In testing communications over electronic channels between electronic devices, the longer the pathway the signal must follow on the communications channel, the more potential exists for electronic noise to be added to the electronic signal transmitted. Thus, as a transmitted signal using one or more protocols propagates through a transmission medium or pathway between communicating electronics components, the longer the distance between the transmission and reception point the more potential exists for noise being imparted to the signal.

Such a communications channel is essentially a pathway over which information or data may be communicated between two or more electronic devices. The pathway may travel over a physical wire that connects communicating devices, or by a wireless communication employing RF or a laser, or other radiated energy sources. The data sent through such communications channels has a source from which the information originates using one or more transmission protocols. At a destination point of delivery of the data, receiving components must discern the transmitted protocol, and then employ the software or electronic components employing that protocol to discern the data from the transmitted signal. Although information or data may originate and transmit from a single source, there may be more than one destination, depending upon how many receiving stations are linked to the communications channel and how much energy the transmitted signal possesses. Some receiving points may receive a proper communication and some may not due to transmission issues along their respective pathway.

In a digital communications channel, the data or information is communicated in the form of individual data bits, which may be encapsulated into multi bit message units. A byte, which consists of eight bits, is an example of a message unit that may be conveyed through a digital communications channel. A collection of bytes may itself be grouped into a frame or other higher-level message unit depending on the communications protocol of the transmission. These levels of data encapsulation facilitate the handling of communications in a complex data communications network.

Most digital messages are significantly longer than just a few bits and are broken into smaller parts and transmitted over the communication channel sequentially, and reassembled at the reception point. A plurality of different channels may provide the pathway for individual respective message segments which are then reassembled at the reception point using the electronic signal protocol for such. Such a reassembly is frequently dependent on the communications protocol used by the transmission device which defines the timing, order, and meaning of the received bits in the transmission, so that the transmission may be reassembled at the receiving point properly. The protocol may also specify a procedure for exchanging messages, error-correction, and other information controlling the hardware which is employed for sending and receiving the electronic communications over the electronic communication pathway.

However, noise and momentary electrical disturbances such as voltage variances or frequency variances, EMF energy, and other types of electrical interference, have a high potential to cause non-continuous signal anomalies which are imparted into the signal transmitted across the channel from the source. Such electrical anomalies can easily cause changes in the transmitted data as it passes through a communications channel which render portions unemployable during reassembly with the appropriate protocol, or yield errors in the communication on reassembly.

This of course can cause significant changes in the discerned data on the receiving end of the channel using the appropriate protocol for the transmission, thus communicating unuseable or intelligible data to the reception point. The potential for such data transmission errors also can occur where the transmission hardware using electronic components for generating the electronic signal according to the protocol used, or with the reception hardware itself. These malfunctions can be caused by defective components yielding errors in the signal varying from the transmission protocol employed, or the receiving electronic device can also error in discerning the incoming signal due to malfunctioning components.

For a technician attempting to ascertain a source of an electronic data communication problem where a signal reception point or device, suffers from lost or unusable data or impaired data communications on the communications channel, a problem arises. The technician has to discern if the errant signal reception is due to electrical disturbances caused by physical defects or EMF along the pathway for the electronic signal, or whether the errant received signal is caused by the component transmitting, or whether the signal received is useable but the component receiving the electronic signal is flawed.

In accomplishing this task, the technician must discern if the lost or corrupted electronic data is a result of hardware, wiring, software, electronic noise, or momentary electrical disturbances such as voltage spikes or frequency or timing variances, when attempting to repair or eliminate unusable electronic signals causing lost or poor data reception.

In the case of secure communications such as those between components of military equipment and aircraft, or commercial equipment communicating secure communications, in addition to the cabled or wireless communication channel having potential problems, such secure communications require keys or codes to render the communication secure, and to decrypted the secure communication. Thus, in addition to the need to know what cabling or wireless communication is required between components, and what communications protocol is being used, a technician must also have the appropriate keys or codes for both the transmitting and receiving device, to run test communications which are discernable. Only with the correct communication channels, protocols, and test or security keys or codes, will a technician be able to test the communications between electronic components and ascertain whether a flawed electronic signal causing the lost or unusable data received at a reception point, is actually caused by transmission or reception hardware or component firmware, or encryption software, or the communications lines or the wireless channel carrying the signal there between.

As a consequence, in order to start and run a test, the technician, as can be discerned, must ascertain the type or identity of each piece of electronics communication equipment which is to be tested. This can be an arduous task for the technicians to try to look up the serial numbers or other identifying indicia on each device. Once the identity of a device is ascertained, the technician must then ascertain the communications channel or cable to connect to each device, the protocol of each device, and if keys are required for testing secured data, and if so, the actual keys to input to each device to run the test. This identification system is very time consuming, especially where identifying indicia on a piece of equipment has been removed or worn off. In many cases, identifying each electronic component, and its related connections and protocols, and keys, can take longer than the test itself. If the technician errors in any of the identifications and related requirements, the test will be invalid or unuseable, and they must redo the setup.

As such their exists an unmet meed, for a system and method for identifying electronic equipment to be tested, which is not dependent up identifying indicia on the electronic communication components. Such a system, in addition to easily identifying each component, should then be able to provided immediate information to the technician as to what cabling or communications channels are required from each piece of identified equipment, as well as the electronic protocols and any keys or codes required for each identified piece of electronic equipment to be connected and tested in combination with the other identified equipment.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of system employing digital photo recognition, to discern a device identity, of each individual electronic component which is to be tested. Once so identified, the system also uses a database and software adapted to the task of providing the user communications protocols, connections, and codes or keys for testing of such electronic components alone or of communications between multiple such electronic components.

The system herein, employs a captured digital image of each electronic component and software adapted to the task of identifying the component identity. Using this component identity, the system employs software adapted to the task of matching the component identity, to a database to ascertain the respective communications protocols and connections, and any keys or codes required to facilitate operative electronic communications of data to and from each identified electronic device.

Employing an electronic device having a computer, electronic memory, a power source, and inputs for digital photos, or at least one digital camera operatively engaged, the system herein employs software running on the computer of the electronic computer such as a laptop, pad, or smartphone, to input the captured image to identify the device identity of each electronic device captured in a digital image. The communications characteristics of each such electronic device are stored in electronic memory in a database of identified electronic devices used for digital or electronic communications.

Using the software-discerned device identity for each device captured in a digital photo, the communications characteristics of a related device to that identified, stored in the database of electronic devices, can be discerned, and communicated to the user planning to connect the identified devices to a testing component or the portable pad, laptop, or other computing device itself.

The communications characteristics can include one or a combination of a group of communications characteristics including, cable connection requirements, wireless frequency requirements, electronic communication protocols to be employed in sending and receiving digital communications signals, and any keys or codes required for input to a respective electronic device to enable coded or secure electronic communication.

Employing the software determined communication characteristics from the database of such characteristics found to be matched to the discerned electronic device identity, the user is thus provided with required information concerning cables, wireless communications, electronic communication protocols to be used, and the connections required to interconnect one or more identified electronic devices to each other and to a testing component, such as the portable computing device which may double as such. Such may be communicated to the user by presenting text and/or photos to an electronically engaged video display, or sending such to an attached printer.

Once the appropriate identified connections are made, and communications protocols are observed, and the electronic devices are conceded to a testing component, testing of electronic communications from and to each identified electronic device may take place.

It is briefly noted that upon a reading of this disclosure, those skilled in the art will recognize various means for carrying out these intended features of the invention. As such it is to be understood that other methods, applications and systems employing software adapted to the task may be configured to carry out these features and are therefor considered to be within the scope and intent of the present invention, and are anticipated.

With respect to the above description, before explaining at least one preferred embodiment of the herein disclosed invention in detail, it is to be understood that the invention is not limited in its application to the details of construction and to the arrangement of the components or steps noted in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device to identify electronic components and their communications interface using optical recognition. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

Figure 5:
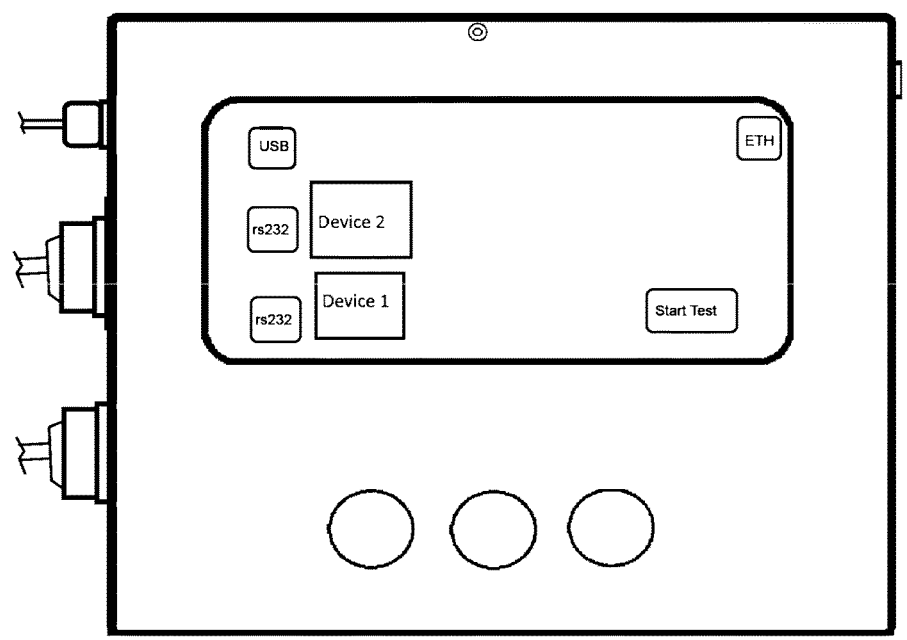

FIG. 5 a generated graphic depiction of the connections required from each identified communication device, to an identified communications port of the portable computing device.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 1:
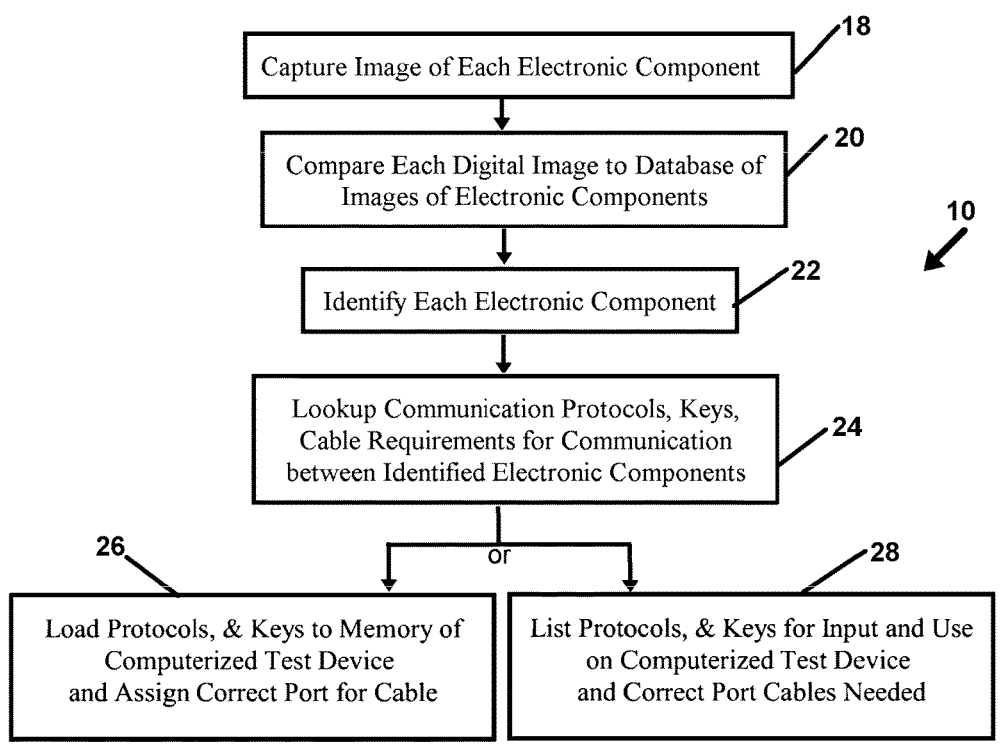
FIG. 1 shows a preferred flow diagram representation of the method herein for discerning an electronic device identity using optical image identification of electronic components and their related communications protocols and connections.
Figure 2:
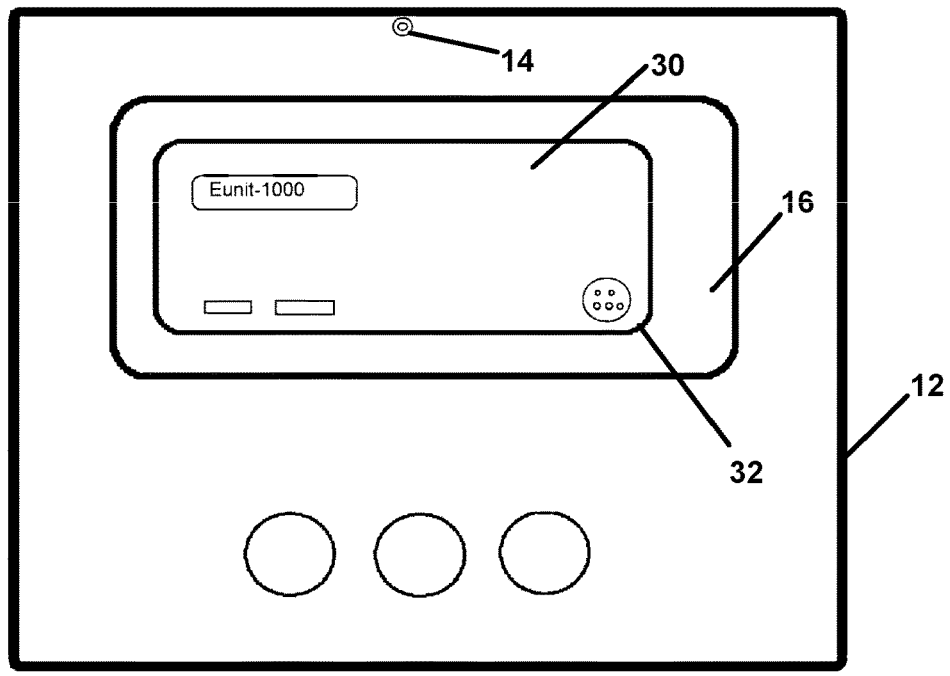
FIG. 2 depicts an electronic device having an onboard computer and digital camera, capturing an image of electronic equipment to be identified.

Now referring to drawings in FIGS. 1-5, there is seen in FIG. 1 a preferred flow diagram representation of the method 10 herein for optical image identification of electronic components and their communications protocols and connections, enabled by the use of a portable computing device 12 having electronic memory and an onboard digital camera 14 and a video display 16 screen shown for example in FIG. 2.

The portable computing device 12 such as a smartphone, a laptop computer or a pad computer having onboard power, a computer and electronic memory adapted for running software therein and storing databases in electronic memory thereon, or having access to electronic data stored in remote electronic memory, runs software to enable the method herein. In a first step, a digital image is captured 18 for each electronic component to be tested for communications there between. Using digital photo identification software, such as that available for facial recognition, but adapted to electronic component recognition, the system and method herein, employs captured digital images of electronic communications components which are compared to a database of electronic component images 20, whereupon the component identity of the electronic component in each digital image is identified 22. Each electronic communications component to be connected to another in a subsequent test of communications there between, is so identified with a component identity.

In a next step, stored information electronic memory of a database relating to each such identified electronic component is accessed, whereupon associated communications characteristics or requirements relating to the component identity, are identified 24, for each identified electronic component. Such associated communications characteristics include electronic data communication protocols, cables needed to interconnect the identified electronic components, communications ports on each identified component to be used for engaging the cables, and software keys or codes required for input to each identified electronic component to place them into operative communication with each other.

The next step depends upon whether one or more of the electronic components identified with a component identity will be engaged through an interface of the portable computing device 12, or whether a known electronic testing component, having known communications ports, will be employed.

If the portable computing device 12 is to be employed and interfaced in-between the identified electronics components, then electronic interface software and testing software running in memory of the computing device 12, will be employed from electronic memory, to provide a respective interface between the two or more identified electronic components, which will electronically communicate during a test. Once interface software and testing software are operative, using the component identity of each electronic component and a database of communications protocols, codes, and keys as related to each identified electronic component, communications protocols and any required keys or codes, will be determined as will the respective ports to connect each identified communication device to the computing device in an identification of communication characteristics 26.

Thereafter the user will employ the identified characteristics 26 for cabling or communications channel to connect the identified proper port on each identified communication device, to a designated communication port on the portable computing device 12, and the appropriate communications protocols, keys or codes will be communicated to the identified electronic components to allow for test communications therebetween using the computing device 12 as an electronic interface. During the resulting test of electronic communications, the testing software running on the portable computing device 12 can monitor data streams communicated in each electronic communication between each identified component which is connected. Whereby flaws in either the identified components or connection components or the like, of one or both connected communications components may be identified.

Alternatively, if the portable computing device 12 itself is not to be employed as the testing connective interface between the identified electronic components, then, a listing of communication characteristics 26 such as protocols, keys, codes, cables required, and communications ports, will be produced and depicted 28 for the user. The list depicted 28 will take into consideration the known testing device to be employed instead of the computing device 12 and its respective communication ports available for connection to the electronic components. The depicted list may include photos or illustrations of the communications characteristics such as cables, ports, and keys, codes, or protocols, if such photos or illustrations will help the user connect to the electronic communications device for testing.

The intended testing device can be input by the user whereupon the communications ports, and other interconnection capabilities of the identified testing device, can be determined using a database of such testing devices and related communications ports and other connective requirements stored therein and related to each respective testing device.

Figure 3:
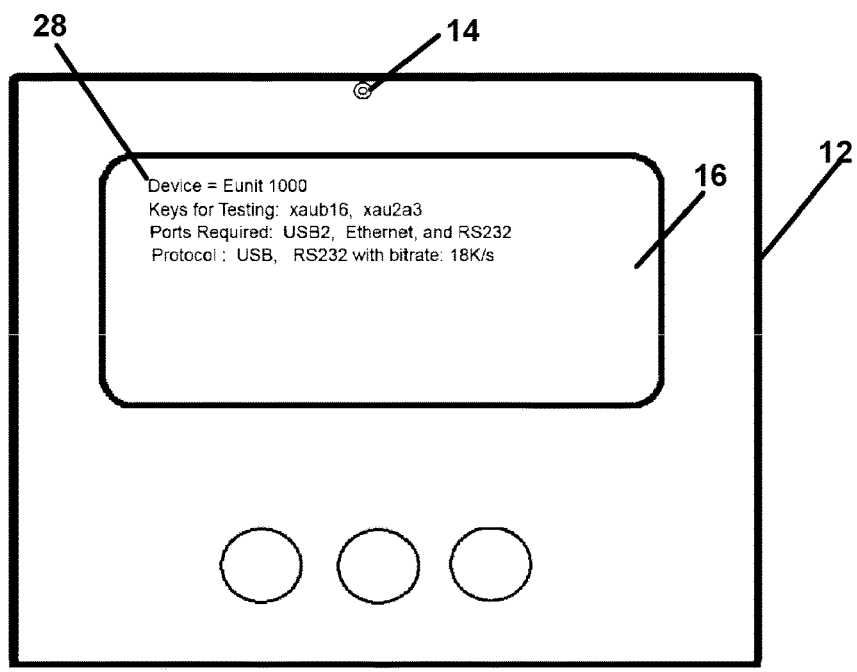
FIG. 3 depicts a graphic communication on the graphic display of the computing device, identifying the device captured in the digital photo, and various communications protocols and required components.
Figure 4:
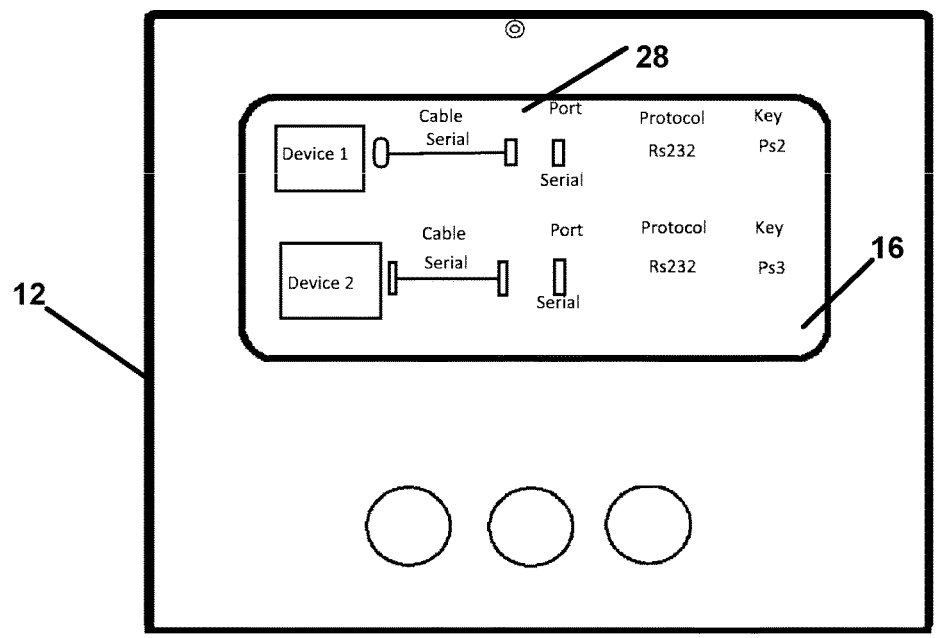
FIG. 4 shows a graphic depiction on the portable computing device, of each identified communications component in a plurality thereof, each respective cable or wireless communications channel, the input ports to the computing device, the protocol and any security keys or codes.

The produced list can be depicted 28 on the video display 16 of the portable computing device 12, for use to engage a known testing interface component using the identified cables, ports, protocols, and keys or codes, such as in FIG. 4 for a graphic and text depiction or FIG. 3 for a text list of the required components, protocols, and any keys or codes.

In either fashion, the user, based on a digital photo of each electronic component to be tested, which is identified by the software running on the computing device, and cross referenced with a database of all such electronic components, is provided with all of the information necessary to interconnect the photo identified electronic components and start communications for testing.

In the prior art, if the user could identify each electronic component, they then had to try to find manuals, or specification sheets for each component, to somehow ascertain the connections, protocols, codes, etc. for each device, and then ascertain how to connect to another. As can be ascertained, great utility is provided by using recognition software and digital photos and relational databases for each identified component to provide almost instant information required for test communications.

An example of the capturing of a digital photograph 30 of an electronic component 32 is shown displayed on the video display 16 in the depiction of FIG. 2. Such is captured using an onboard digital camera 14 which on most pad computers, laptops, and smartphones is positioned on both sides of the device.

FIG. 3 depicts a graphic depiction, on the video display 16 of the computing device 12, of the step noted above in 28, of identifying the device captured in the digital photo, and various communications characteristics 26 such as protocols, codes, keys, and cables and ports required for a known testing component with known communication inputs and functions. The same information can be depicted 28 in a graphic form, rather than solely in text, as shown in the depiction of FIG. 4.

FIG. 4 shows a graphic depiction 28 on the portable computing device 12, of each identified communications component in a plurality thereof, each respective cable or wireless communications channel, the input ports to the computing device or user identified testing component, the communications protocol and any security keys or codes.

Finally, FIG. 5 shows a graphic depiction which may be displayed upon the video display 16 of the computing device 12, where the computing device 12 itself is to be used for testing in a connection between two electronic devices. Shown in this mode, depictions of communications ports are positioned adjacent their location upon the computing device 12, and a depiction of which of the two electronic devices to be connected is positioned adjacent the depiction of the communications port of the computing device 12. Thus, the user is shown the proper port 40 to connect each respective communication device 41 using the cable identified previously as being required such as shown in FIG. 4.

Thus, in all modes of the method and apparatus herein, the user is provided with complete connection, protocol, and security information for each communication device to be tested, based upon the captured digital image of each respective device.

While all of the fundamental characteristics and features of the image-based identification and configuration system have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A method of identifying and testing electronic communication components employed for transmitting and receiving electronic communications, comprising the steps of:
   capturing a digital image of each said electronic communication component;
   communicating said digital image to electronic memory of a computing device;
   employing recognition software running in said electronic memory, to compare each said digital image of each respective electronic communication component to a database of electronic component images held in electronic memory to ascertain a component identity relating to each said electronic component;
   employing software running in electronic memory which adapted to the task of matching each ascertained said component identity to respective communication characteristics limited to each said component identity, from a database held in electronic memory of communications characteristics individually related to each said component identity;
   employing software running on said computing device to communicate to a video display or printer, a graphic depiction of said communications characteristics determined as respectively limited to said electronic communication component based upon its component identity, whereby a user can subsequently employ respective said communications characteristics depicted and respectively limited to each said electronic communication component to connect testing equipment thereto; and
   using said computing device as an interface for at least one identified electronic communication component during a test.

2. The method of identifying and testing electronic communication components of claim 1, additionally comprising the steps of:
   including in said database held in electronic memory of communications characteristics limited to each said component identity, a group of said communications characteristics limited to each respective component identity including electronic communication protocols, software keys, security codes, cables required, and communications ports to be employed, of each respective said electronic communication component.

3. The method of identifying and testing electronic communication components of claim 2, additionally comprising the steps of:
   including photos or illustrations of any of said electronic communication protocols, software keys, security codes, cables required, and communications ports to be employed, in said graphic depiction of said respective list of said communications characteristics determined as respectively limited to each respective said electronic communication component.

4. The method of identifying and testing communication components of claim 1, further comprising:
   connecting an identified proper port on the at least one identified electronic communication component during a test to a designated communication port on said computing device.

5. The method of identifying and testing communication components of claim 1, further comprising:
   monitoring data streams communicated by the at least one identified electronic communication component.

6. The method of identifying and testing communication components of claim 5, further comprising:
   determining flaws in the at least one identified electronic communication component or a connection component.

7. The method of identifying and testing communication components of claim 1, wherein the at least one identified electronic communication component includes a first electronic communication component and a second electronic communication component.

8. The method of identifying and testing communication components of claim 7, wherein the first electronic commination component and the second electronic communication component are connected by said computing component, wherein said computing component performs said test.

9. A method of identifying and testing electronic communication components employed for transmitting and receiving electronic communications comprising:
   providing a computing device having a digital camera, an electronic memory and a display;
   capturing a digital image of a first electronic communication component with said digital camera;
   identifying the first electronic communication component by comparing the captured digital image to a database of electronic communication component images stored in said electronic memory;
   displaying information related to communication characteristics associated with the first identified electronic communication component with said display;
   capturing a digital image of a second electronic communication component with said digital camera;
   identifying the second electronic communication component by comparing the captured digital image to a database of electronic communication component images stored in said electronic memory;

displaying information related to communication characteristics associated with the second identified electronic communication component with said display;

interfacing said first electronic communication component with said second electronic communication component based on the communication characteristics associated with the first identified electronic communication component and the communication characteristics associated with the second identified electronic communication component;

performing a test of a communication channel between said first electronic communication component and said second electronic communication component.

10. The method of identifying and testing electronic communication components of claim 9, wherein the communication characteristics include one of an electronic communication protocol, software key, security code, cables required, and communications ports to be employed.

11. The method of identifying and testing electronic communication components of claim 9, wherein the displaying includes a graphic depiction of one of an electronic communication protocol, software key, security code, cables required, and communications ports to be employed.

12. The method of identifying and testing electronic communication components of claim 9, wherein the interfacing comprises utilizing said computing device to connect said first electronic communication component and said second electronic communication component.

13. The method of identifying and testing electronic communication components of claim 12, wherein the displaying includes depictions of communication ports positioned adjacent their location upon said computing device, and a depiction of said first electronic communication component or said second electronic communication component positioned adjacent to one or more of the depictions of communication ports.

14. The method of identifying and testing electronic communication components of claim 9, wherein said computing device performs said test.

15. The method of identifying and testing electronic communication components of claim 9, wherein a testing component performs said test.

* * * * *